Patented Aug. 17, 1926.

1,596,593

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR TREATING PETROLEUM EMULSIONS.

No Drawing.   Application filed October 1, 1925. Serial No. 59,952.

This invention relates to the treatment of emulsions of mineral oil and water, such as petroleum emulsions, for the purpose of separating the oil from the water.

Petroleum emulsions are of the water-in-oil type and consist of oil constituting the continuous phase of the emulsion, droplets of water distributed throughout the body of oil and constituting the dispersed phase of the emulsion and films of matter that encase the droplets of water. They are obtained from producing wells and from the bottom of oil storage tanks and are commonly referred to as "cut oil", "roily oil", "emulsified oil" and "bottom settlings".

The object of my present invention is to provide a novel and inexpensive process for separating emulsions of the character referred to into their component parts of oil and water or brine.

Briefly described, my process consists in subjecting a petroleum emulsion to the action of a suitable demulsifying agent or agents in the form of a pseudo nascent, highly colloidal, coagulescent suspension. Some of the demulsifying agents that can be used in my process are saponaceous, water-softening agents, especially soaps, modified fatty acids and their soaps, the soluble salts of sulphonated petroleum acids, a water-wettable compound of the kind described in my pending application for patent Serial No. 757,737, filed December 23, 1924, certain insoluble organic salts, such as calcium oleate, and certain water insoluble salts of petroleum acids and water insoluble salts of sulphonated petroleum acids.

To convert materials of the kind above mentioned into demulsifying agents capable of use with my process, the selected material is first dissolved in water or oil and subjected to the action of an inorganic salt so as to separate out a hydrated, pseudo nascent, highly colloidal, coagulescent suspension that is substantially nascent and which for convenience I will refer to as pseudo nascent. The most suitable way of effecting this is to subject a water soluble treating agent to the action of a concentrated brine, thus salting out the material in the desired form. Another way is to subject the aqueous solution to the precipitating action of a soluble neutral or basic alkaline earth or heavy metal salt, thus producing the desired form. Still another way is to subject the solution of a chemical treating agent in oil to the precipitating action of a neutral or basic alkaline earth or heavy metal salt, thus producing the desired form.

After the demulsifying agent or agents have been produced, as above described, it is brought into contact with the emulsion to treat the same either by introducing the treating agent into a well in which a petroleum emulsion is being introduced; introducing the treating agent into a conduit through which a petroleum emulsion is flowing; introducing the treating agent into a tank in which a petroleum emulsion is stored, or introducing the treating agent into a container that holds the sludge obtained from the bottom of an oil storage tank. The treating agent can even be introduced in a producing well in such a way that it will become mixed with water or oil that is emerging from the ground before said water and oil enter the barrel of the well pump or the tubing up through which said water and oil flow to the surface of the ground. After treatment the emulsion is allowed to stand in a quiescent state, at a suitable temperature, so as to permit the water or brine to separate from the oil, or it may be passed through a variety of apparatus, such as hay tanks, gun barrels, etc., such as are now commonly used in the operation of "breaking" petroleum emulsions. It may even be passed through a centrifugal or electrical dehydrator.

The advantage of using a demulsifying agent in the form above described, namely in the form of a pseudo nascent, highly colloidal, coagulescent suspension, is that the cost of treating an emulsion is materially reduced, due to the fact that less treating agent is required, less time is required to produce a "break" and the emulsion can be maintained at a lower temperature during the "breaking" operation.

I attribute the desirable results above mentioned to the increased segregation of the treating agent at the interfaces of the emulsion, for it is now well recognized in the art of treating petroleum emulsions for the purpose of separating the oil from the water, that the agent used to treat the emulsion must segregate itself at the interfaces. It is also recognized that only colloids segregate at the interfaces and that the colloidality of any treating substance can show marked variations. For instance, sodium oleate may be ionically or molecularly dispersed in alcohol. Its dilute solution in water may be colloidal. Its dispersion in brine is so colloidal that coagulation follows. Therefore, I propose to take the water solution of a suitable treating agent, such as sodium resinate, sodium oleate, ammonium hydroxystearate, or potassium sulpho-naphthenate and coagulate it by mixing the solution with approximately an equal volume of brine of any soluble salt, such as sodium chloride or sodium sulphate, thus increasing the colloidality of the treating agent up to and even past the coagulating point, and consequently, obtaining increased treating efficiency and lower cost.

This same increased colloidality can also be obtained in the case of substances similar to water insoluble compounds, such as calcium oleate, magnesium resinate, calcium hydroxystearate, calcium sulpho-naphthenate. Such substances give solutions in oil, but they also give colloidal suspensions in water while in the freshly precipitated or nascent state. Therefore, this same maximum colloidal effect can be obtained by mixing a water soluble salt with another water soluble salt, so as to produce these substances by double decomposition, in a pseudo nascent, freshly precipitated, coagulatable, highly colloidal state. For instance, sodium oleate can be mixed with calcium chloride so as to give colloidal calcium oleate. Ammonium resinate can be mixed with magnesium sulphate, so as to give colloidal magnesium resinate. Potassium hydroxystearate can be mixed with barium salts so as to give colloidal barium hydroxystearate. Sodium sulpho-naphthenate can be mixed with calcium chloride so as to give colloidal, calcium sulpho-naphthenate. The precipitating salt can be used in any suitable concentration, and in many instances the hardness of the oil well brine itself will be sufficient, provided a relatively large quantity of hard water is mixed with the solution of treating agent to be coagulated. I wish to point out that the hardness of the water need not be sufficient to combine absolutely completely and there may be treating agent in excess. On the other hand, the excessive amount of hardness in the water is not objectionable.

The precipitating salt need not be calcium or magnesium, but may be iron, copper or any heavy metal salt. It is just as feasible to employ a treating agent of an acidic nature, such as oleic acid, iso-oleic acid, resin, di-hydroxystearic acid, and so forth, either in undiluted state or in oil solution, and bring it into contact with a suitable solution basic in character, such as calcium hydrate, magnesium bi-carbonate, or iron hydroxide. In order to determine the desirability of any chemical treating agent for use in this improved form, it is only necessary to mix the solution in water or in oil with strong salt brine, or a solution of magnesium sulphate or a solution of calcium hydroxide, or calcium sucrate. If a pseudo nascent, highly colloidal, coagulescent suspension is formed, the treating agent is satisfactory. The selection of the mixing precipitating solution, whether salty brine or neutral hard water in dilute or concentrated state, or basic hard water in dilute or concentrated state, or a combination of two or more, will depend upon local factors at the point of application.

Having thus described my invention, what I claim as new and desire to secure by Letters Patent is:

1. A process for treating petroleum emulsions, characterized by subjecting the emulsion to the action of a suitable chemical demulsifying agent in the form of a highly colloidal, coagulescent suspension containing a soap-forming organic radical.

2. A process for treating petroleum emulsions, characterized by subjecting the emulsion to the action of a suitable chemical demulsifying agent in the form of a highly colloidal, coagulescent suspension obtained by the action of a precipitating, inorganic solution on a water soluble substance containing a soap-forming organic radical.

3. A process for treating petroleum emulsions, characterized by subjecting the emulsion to the action of a water insoluble, chemical demulsifying agent in the form of a highly colloidal, coagulescent suspension obtained by the action of a precipitating, inorganic solution on a water soluble substance containing a soap-forming organic radical.

MELVIN DE GROOTE.